Nov. 26, 1929.  A. G. RAYBURN  1,736,836

DRIVE AXLE

Original Filed June 7, 1923   3 Sheets-Sheet 1

INVENTOR.
ALDEN G. RAYBURN
BY
his ATTORNEYS.

Nov. 26, 1929. A. G. RAYBURN 1,736,836
DRIVE AXLE
Original Filed June 7, 1923 3 Sheets-Sheet 2

INVENTOR.
ALDEN G. RAYBURN
BY White Prost Evans
his ATTORNEYS.

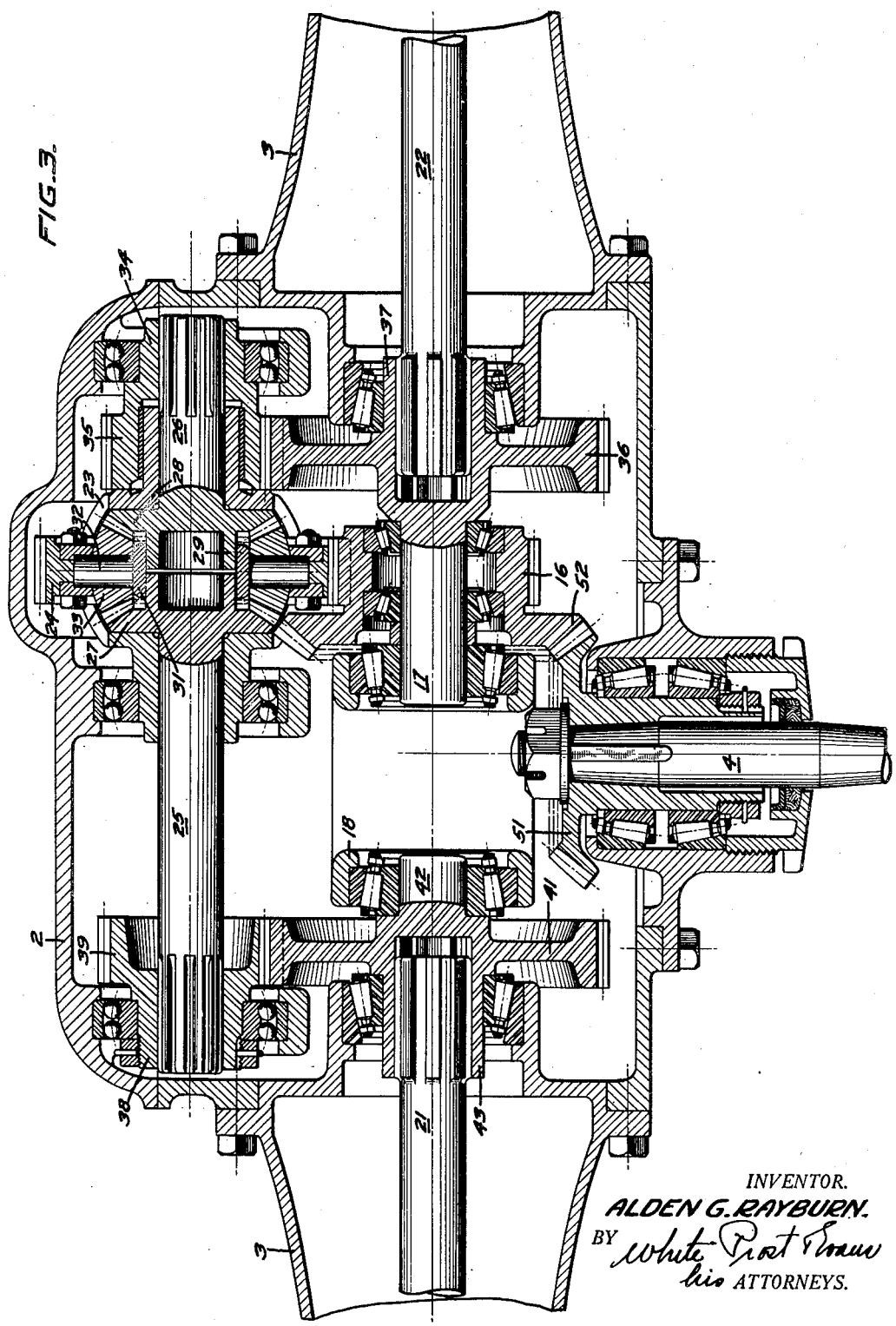

Patented Nov. 26, 1929

1,736,836

UNITED STATES PATENT OFFICE

ALDEN G. RAYBURN, OF SAUSALITO, CALIFORNIA, ASSIGNOR TO EMORY WINSHIP, OF SAN FRANCISCO, CALIFORNIA

DRIVE AXLE

Application filed June 7, 1923, Serial No. 643,860. Renewed May 5, 1928.

The invention relates to drive axles and particularly to a double reduction or triple reduction axle for use on motor vehicles.

An object of the invention is to provide a double or triple speed reduction axle in which the major torque strains are concentrated along a single axis.

Another object of the invention is to provide a compact and efficient double or triple reduction axle.

Another object of the invention is to provide a through drive double or triple reduction gear axle.

A further object of the invention is to provide a four wheel drive actuated by a single propeller shaft, in which each of the four wheels is capable of being driven differentially.

Another object of the invention is to provide a double or triple reduction gear axle in which the axle parts and the main driving shaft lie in the same horizontal plane.

The invention possesses other advantageous features, some of which, with the foregoing, will be set forth at length in the following description, where I shall outline in full that form of my invention which I have selected for illustration in the drawings accompanying and forming part of the present specification. In said drawings I have shown one embodiment of my invention, but it is to be understood that I do not limit myself to such form, since the invention, as set forth in the claims, may be embodied in a plurality of forms.

Referring to said drawings:

Figure 3 is a horizontal section through a triple reduction gear axle embodying my invention.

Figure 1:
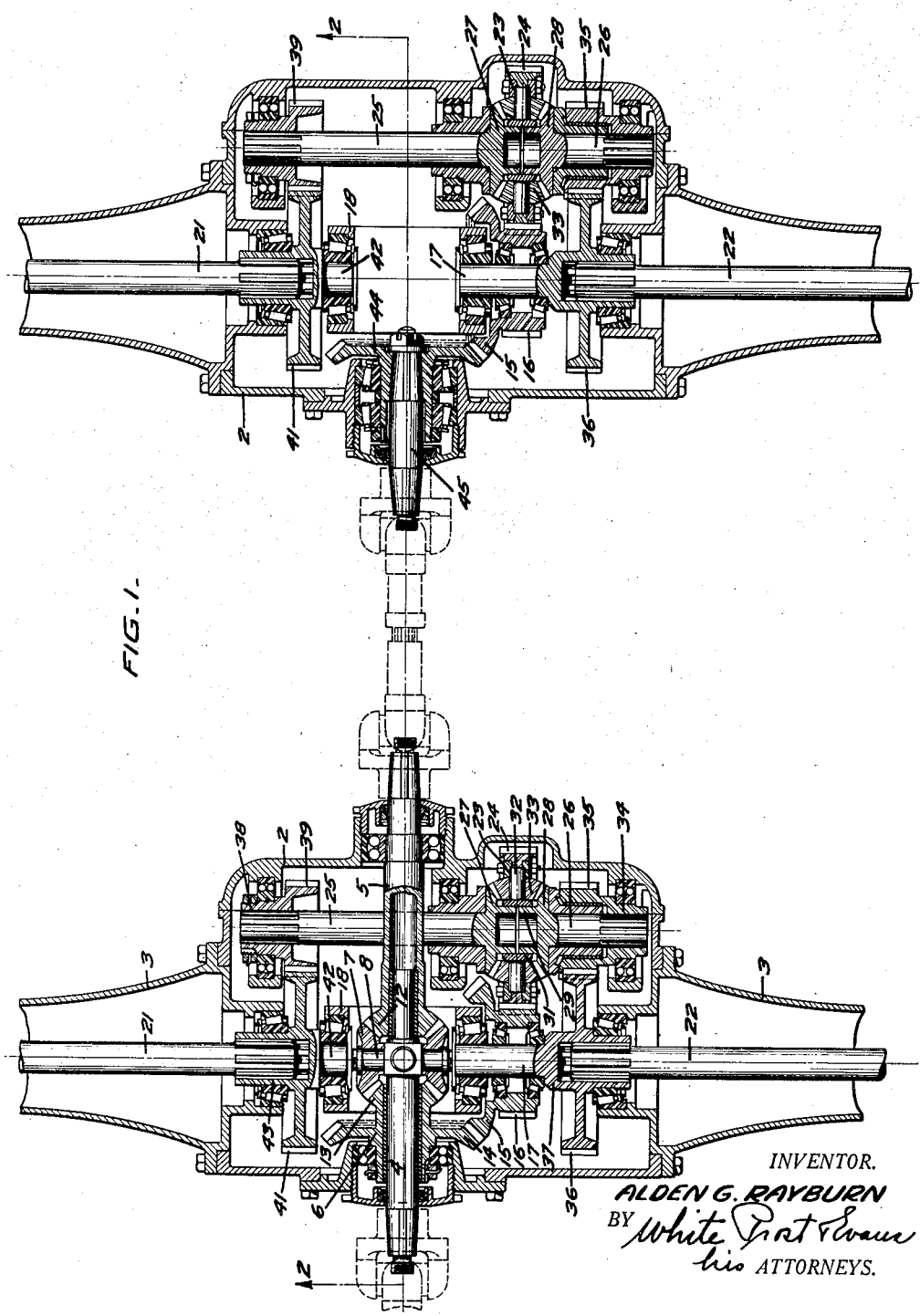
Fig. 1 is a horizontal section through a pair of connected double reduction gear axles embodying my invention.

The axle of my invention is particularly adapted to be used in connection with heavy vehicles which are propelled by internal combustion engines. The invention may be embodied in an axle producing a double speed reduction or in an axle producing a triple speed reduction. It may also be embodied in a tandem drive comprising two axles driven by a single propeller shaft so that all four wheels are differentially driven. When the invention is employed in a tandem drive, a differential is interposed between the propeller shaft and the drive shaft of the second axle so that the two axles are driven differentially, but when only one axle is employed, the differential at the propeller shaft may be omitted. In the tandem drive, the front axle and the rear axle are similar with the exception that the front axle is provided with a through shaft and with a differential between the propeller shaft and the through shaft, whereas the rear axle is of the construction which will be employed in a vehicle having only one driving axle.

The front axle comprises the gear housing 2 to which is secured the drive axle housings 3 which extend to the wheels and which carry the vehicle load. Journaled in the gear housing 2 and projecting from the front thereof is the main drive shaft 4 to which the propeller shaft is connected. The main drive shaft is journaled at its rear end in the tube 5 which projects from the front housing at the rear and forms the through drive shaft. At its forward end the main drive shaft 4 is journaled in the hub 6 which constitutes the drive shaft of the front axle and a differential gear is interposed between the main drive shaft 4 and the through drive shaft 5 and the front axle drive shaft 6 so that the drive shafts 5 and 6 are differentially driven. The differential comprises the four differential pinions 7 arranged in pairs on the stub-shafts 8 which extend at right angles from the main drive shaft 4. The four stub-shafts 8 are at right angles to each other so that the two pairs of differential pinions 7 rotate on axes at right angles to each other. Meshing with the differential pinions 7 are the differential driven gears 12 and 13 which are secured respectively to and preferably formed integrally with the through shaft 5 and the front axle drive shaft 6. Secured to and preferably formed integral with the front axle drive shaft 6 is the driving pinion 14. The hub 6, the differential driven gear 13 and the driving pinion 14 are preferably formed integral and form the forward bearing for the main drive shaft 4 and the integral structure is rotatable with respect to the main drive shaft 4 and is suitably journaled in the housing 2.

Meshing with the driving pinion 14 is the master gear 15 which is shown as being of the same diameter as the pinion 14 so that no speed reduction takes place between the pinion and the gear. Formed integral with the master gear 15 is the spur gear 16 which is preferably of lesser diameter than the master gear 15. The integral structure, forming the gears 15 and 16 is suitably journaled on the shaft 17 which in turn is journaled on its inner end on the frame or brackets 18 secured to the housing 2.

Motion is transmitted from the spur gear 16 to the drive axle parts 21 and 22 through a differential gear so that the drive axle parts are differentially rotatable with respect to each other. Journaled in the housing 2 is a differential housing 23 to which is secured a ring gear or differential housing gear 24 which meshes with the spur gear 16. The differential housing gear 24 is larger in diameter than the spur gear 16 so that a speed reduction is produced between these two gears. Journaled in the differential housing 23 are the jack shafts 25 and 26 which are provided on thier adjacent ends with differential driven gears 27 and 28. These gears are provided on their adjacent faces with cylindrical extensions 29 which form a bearing for the ring 31 carrying the stub-shafts 32 on which the differential pinions 33 are rotatably mounted. These stub-shafts 32 extend into seats in the differential housing 23 so that the ring 31 is rotatable with the housing. The differential pinions 33 are enmeshed with the differential driven pinions 27 and 28 so that these two latter pinions may be driven differentially. The pinions 27 and 28 are preferably integral with the jack shafts 25 and 26. Splined to the jack shaft 26 and journaled in the housing 2 is a hub 34 having an off-set spur gear 35 in which the differential housing is journaled. The spur gear 35 meshes with the spur gear 36 which is integral with the shaft 17. The spur gear 36 is provided with a hollow hub 37 in which the end of the driving axle 22 is splined so that the driving axle rotates with the gear 36. The driving axle 22 is thus axially aligned with the shaft 17 so that the main driving parts is all concentrated along the center line passing along the axis of the drive axle 22 and the shaft 17.

The axis of the aligned jack shafts 25 and 26 is displaced vertically, and in the present instance depressed, so that the jack shaft 25 will pass under the through drive shaft 5. Splined to the end of the jack shaft 25 is a hub 38 journaled in the housing and provided with an integral off set spur gear 39 which is of the same diameter as the spur gear 35. Meshing with the spur gear 39 is a spur gear 41 which is of the same diameter as spur gear 36 and which is integral with the shaft 42, which is axially aligned with the shaft 17. The gear 41 is provided with a hollow hub 43 and splined in the hub is the drive axle 21. The drive axles 21 and 22 and the drive shafts 17 and 42 are thus axially aligned so that the major torque strains are concentrated along a single axis. When desired the main drive shaft 4 may be so disposed, and in the present instance is so disposed, that the axis of the main drive shaft 4 intersects the axis of the drive axles 21 and 22, so that the drive axle and the main drive shaft, all lie in the same horizontal frame.

The rear axle of the tandem drive is substantially identical with the front axle, with the exception that there is no through drive shaft and the differential between the main drive shaft and the through drive shaft is omitted. In the rear axle, the driving pinion 44 is secured directly to the main drive shaft 45 which is suitably journaled in brackets secured to the housing.

Figure 2:
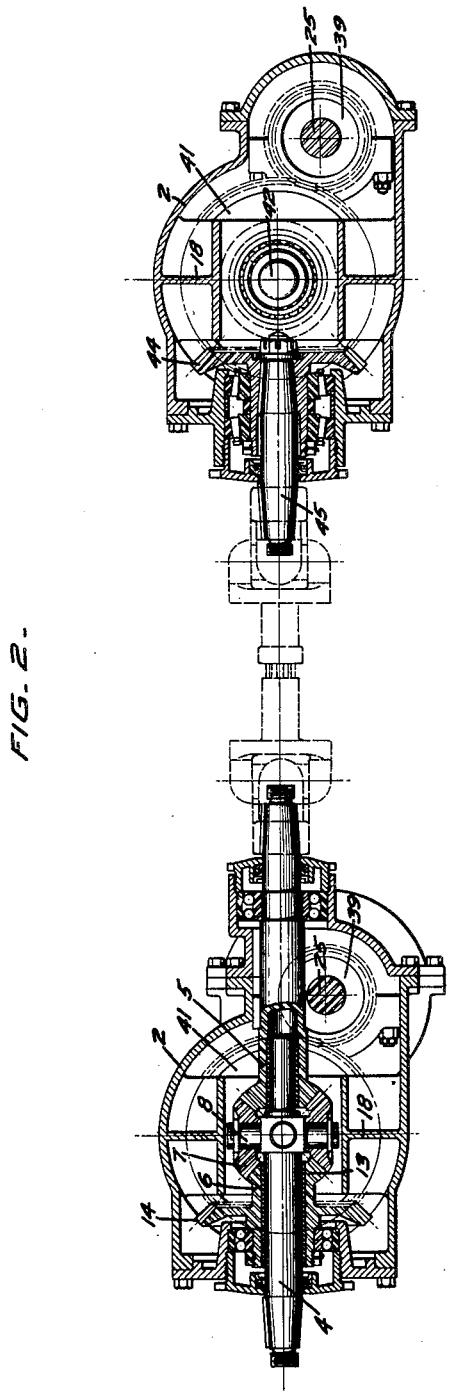
Fig. 2 is a vertical section taken on the line 2—2 Figure 1.

In Figure 3 I have shown a triple reduction gear axle embodying my invention. In Figures 1 and 2, the gears 14 and 15 are of the same diameter so that no speed reduction is obtained between these two gears. In Figure 3 the diameter of the driving pinion 51 is less than the diameter of the master gear 52 so that a reduction in speed obtains between these two gears. In other respects the construction of this axle is substantially identical with that shown in Figure 1. The first reduction occurs between the gears 51 and 52, the second reduction occurs between gears 16 and 24 and the third reduction occurs between gears 35 and 36 and 39 and 41.

This axle may be constructed to produce a through drive, as is shown in the left hand axle in Fig. 1, by incorporating the differential between the propeller shaft and the through shaft, but since the construction, other than the relative diameters of the bevel gears 51 and 52, is the same as that shown in the left hand axle in Fig. 1, it is not believed necessary to repeat the disclosure in the drawings.

The jack shaft 25—26, in the through drive axle is lowered so that the through shaft 5 may pass over it, but when a through drive is not employed, the axis of the shafts 25—26 may lie in the plane of the axis of the main drive shaft.

The reduction gear construction of my invention permits the use of an axle housing having small vertical dimensions, thereby providing large clearances between the housing and the road and the housing and the vehicle body, thus producing a construction that may be advantageously employed in low body or small wheel vehicles, such as street cars.

I claim:

1. A drive axle comprising a driving shaft, a pair of axially alined driven axles disposed at right angles to the driving shaft, a master gear axially alined with said axles, means for transmitting power from the driving shaft to the master gear, a gear secured to the master gear, a jack shaft driven by said latter gear, gearing connecting the jack shaft with the driven axles and a differential interposed between the master gear and the driven axles.

2. A drive axle comprising a driving shaft, a pair of axially alined driven axles disposed at right angles to the driving shaft, a master gear axially alined with said axles, means for transmitting power from the driving shaft to the master gear, a gear secured to the master gear, a differential housing gear meshing with said latter gear, differential pinions carried by said housing gear, a pair of alined jack-shafts, differential driven gears on said jack-shafts meshing with said pinions and speed reduction gears connecting the jack-shafts with the driven axles.

3. A drive axle comprising a driving shaft, a through drive shaft, a driving pinion, a differential interposed between the main drive shaft and the through shaft and driving pinion, a master gear meshing with the driving pinion, a pair of driven axles alined with the master gear, speed reducing gearing interposed between the master gear and the driven axles and a differential interposed between the master gear and the driven axles.

4. A drive axle comprising a housing, a driving shaft extending into the housing, stub shafts on said shaft, differential pinions journaled on said sub-shafts, a pair of differential driven gears meshing with said pinions, a through drive shaft secured to one of said differential driven gears and projecting from the housing on the opposite side from the driving shaft, a driving pinion secured to the other differential driven gear, a master gear meshing with the driving pinion, a pair of driven axles axially alined with the master gear, speed reducing gearing interposed between the master gear and the driven axles and a differential gear interposed between the master gear and the driven axles.

5. A drive axle comprising a drive shaft; a pair of axially aligned driven axles with the axes of rotation thereof substantially in the plane of and at right angles to the axis of rotation of said drive shaft; a through drive shaft; a differential mechanism between said first mentioned drive shaft and said through drive shaft arranged between said driven axles; and a differential drive mechanism for said driven axles driven from said first mentioned differential mechanism.

6. The combination as set forth in claim 5 in which the axes of said first mentioned drive shaft and said through shaft are in substantial alignment.

7. A drive axle comprising a drive shaft; a differential drive pinion driven by said shaft; a pair of differential gears driven by said pinion; a through drive shaft driven by one of said differential gears; a differential mechanism driven by the other of said gears; and a pair of live axles disposed on opposite sides of said drive shaft and first named differential with the axes of rotation thereof substantially in the plane of the axis of said first mentioned drive shaft; said live axles being differentially driven from said last mentioned differential mechanism.

8. The combination as set forth in claim 7 in which the axis of said through drive shaft is disposed substantially in the plane of said first mentioned drive shaft.

9. A drive mechanism for a tandem axle road vehicle comprising a housing for one of said axles, a propeller shaft extending into said housing, a drive shaft for the other axle journalled in said housing, axle sections journalled in said housing, said shafts and axle sections being arranged so that their axes lie in substantially the same horizontal plane, a differential mechanism for differentially driving said axle sections, a second differential mechanism for differentially driving said drive shaft and said first named differential, both of said differentials being journalled in said housing in proximity to each other for rotation about axes located approximately in said horizontal plane and in substantial spaced relation to the walls of said housing.

10. A drive mechanism for a tandem axle road vehicle comprising a housing for one of said axles, a propeller shaft extending into said housing, a drive shaft for the other axle journalled in said housing, axle sections journalled in said housing, means to differentially drive said axle sections, the axes of said axle sections and shafts being disposed in the same horizontal plane, a differential mechanism journalled in said housing, between the horizontal planes which bound the upper and lower surfaces of the latter, for differentially driving said drive shaft and said means, said differential mechanism being arranged with its plane of rotation substantially in coincidence with the vertical plane that contains the axes of the axle sections.

In testimony whereof, I have hereunto set my hand.

ALDEN G. RAYBURN.